March 8, 1966     C. N. CERONE     3,238,971
FLUID DISTRIBUTION VALVE
Filed April 3, 1963     2 Sheets-Sheet 1
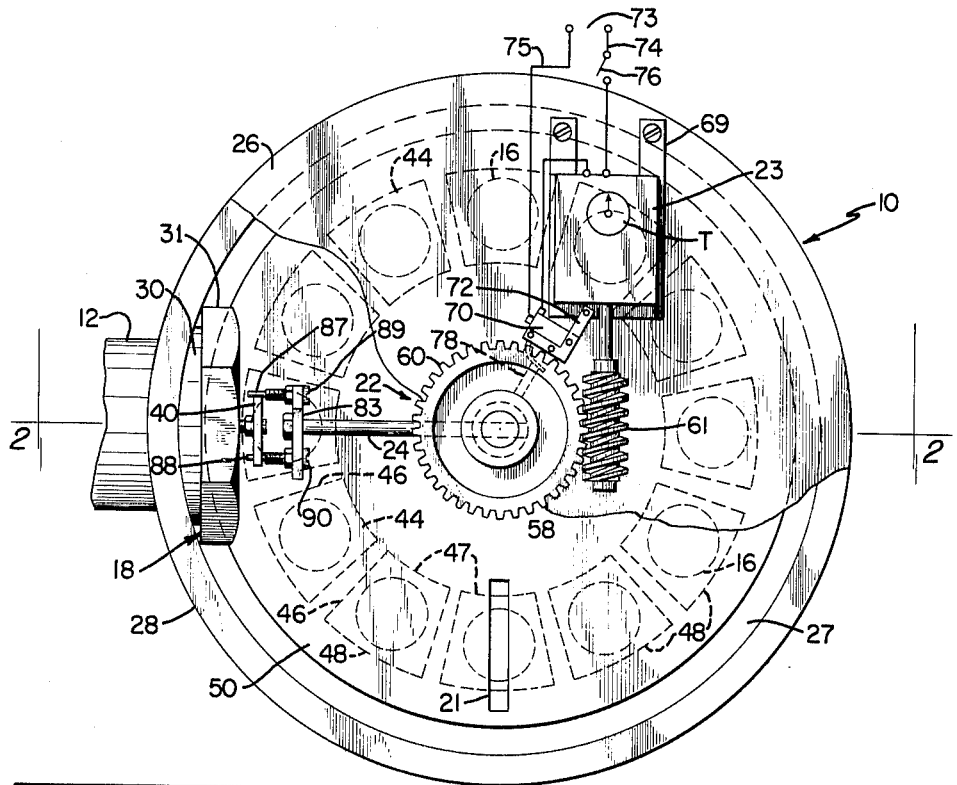
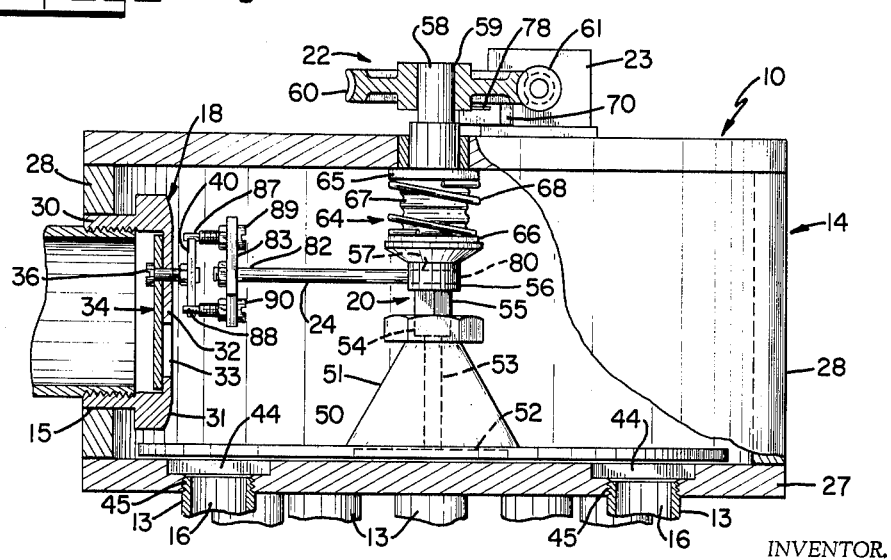
INVENTOR.
CARMINE N. CERONE
BY
*John E. Reilly*
ATTORNEY March 8, 1966 C. N. CERONE 3,238,971
FLUID DISTRIBUTION VALVE
Filed April 3, 1963 2 Sheets-Sheet 2

INVENTOR.
CARMINE N. CERONE
BY
ATTORNEY

United States Patent Office 3,238,971
Patented Mar. 8, 1966

3,238,971
FLUID DISTRIBUTION VALVE
Carmine N. Cerone, 3160 Simms St., Lakewood 15, Colo.
Filed Apr. 3, 1963, Ser. No. 270,412
12 Claims. (Cl. 137—614.11)

This invention relates to a novel and improved fluid distribution valve; and more particularly relates to a liquid distribution valve for use in sprinkling systems to automatically and sequentially control the supply of water to a plurality of outlet lines from one or more inlet sources.

In accordance with the present invention, it is a principal and foremost object thereof to provide for a fluid distribution valve which is characterized by its simplicity and minimum number of parts, and which can be closely and accurately controlled to supply fluid from a single source to a plurality of outlet lines in succession.

It is another object of the present invention to provide for a liquid control valve which is conformable for use in various types of existing sprinkler systems as a means of controlling the supply and distribution of water through a plurality of sprinkler lines in an efficient and dependable manner, while at the same time eliminating the necessity of individual valve controls, as well as minimizing turbulence and rapid pressure changes in opening and closing each sprinkler line.

It is a further object of the present invention to provide for an improved liquid distribution valve for controlling the supply and distribution of liquid between one or more inlet lines and one or more outlet lines, and having inlet and outlet flow control means adapted to be automatically and cooperatively opened and closed for the sequential flow of liquid through each of the outlet lines; moreover, wherein the inlet and outlet flow control means are so related in opening and closing as to assure emptying of the liquid at the end of each cycle of water thereby eliminating the possibility of freezing and greatly reducing corrosion of the moving parts.

It is a still further object of the present invention to provide in a fluid distribution valve for an improved inlet valve control assembly characterized by its improved sealing qualities while requiring minimum force in opening and closing.

It is an additional object of the present invention to provide for an improved rotary seal assembly adapted for use in a fluid distribution valve for effectively and automatically controlling in sequence the distribution of water through a plurality of outlet lines and in such a way as to minimize turbulence and pressure changes in supplying each line in succession while maintaining a fluid-tight relation with the outlet lines not being supplied.

The above and other objects, advantages, and features of the present invention will become more readily understood and appreciated from a consideration of the following detailed description taken together with the accompanying drawings, in which:

FIGURE 1 is a top plan view of a preferred form of fluid distribution valve interpositioned between a single inlet line and a plurality of outlet lines in a sprinkling system.

FIGURE 2 is a view partially in section taken on lines 2—2 of FIGURE 1.

Figure 3:
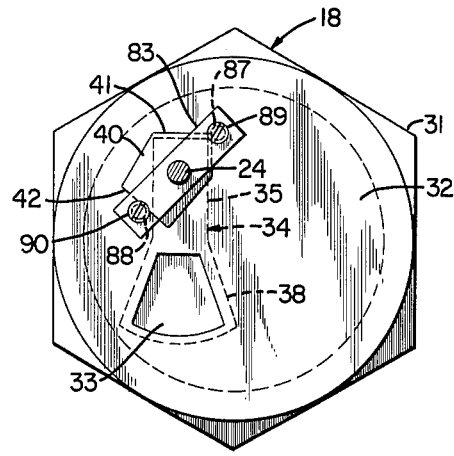
FIGURE 3 is a detailed, enlarged view of the inlet flow control valve assembly with the valve being shown in the closed position.

The various features and advantages of the present invention may be best understood by reference to its use as a main control valve 10 in a sprinkler system, the valve being utilized to control both the amount and sequence of flow of water from a single inlet line 12 to a plurality of outlet or sprinkler lines 13. Essentially, the valve 10 is comprised of a manifold in the form of a generally cylindrical housing 14 having a lateral inlet port 15 and a series of downwardly directed outlet ports 16. An inlet flow control valve assembly designated at 18 is positioned across the inlet port 15 to control the introduction of water from the inlet line into the manifold; and a rotary seal assembly, designated at 20, is disposed in fluid-tight relation over the outlet ports with a control aperture or slot 21 in the seal which is aligned for advancement into registry with each of the outlet ports in succession. Advancement of the control aperture is regulated by a drive means including a gear drive 22 and drive motor 23, and which means simultaneously controls movement of an inlet control arm 24, the latter being engageable with the inlet valve assembly to control opening and closing of the inlet port. In this way, the inlet opening and closing can be synchronized with advancement of the control aperture 21 for the distribution of water through each of the outlet ports 16 in succession and through one or more cycles of operation. In this relation, it will be noted that the valve is reversible, or in other words, the outlets may in fact be employed as multiple inlets to deliver several fluids in succession into the manifold for mixing and recovery through one or more inlet lines.

Referring in more detail to the preferred form of invention, the manifold 14 is illustrated as being in the form of a generally cylindrical housing having top and bottom walls 26 and 27 separated by a side wall 28. Most desirably, the housing is composed of a non-corrosive material, such as, polyethylene, so that it can be installed outdoors or underground and not be subject to the detrimental effects of the soil or weather.

Figure 4:
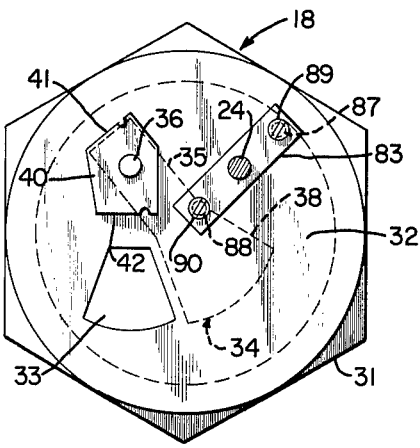
FIGURE 4 is another enlarged view of the inlet flow control valve assembly showing the relationship between parts in the open position.
Figure 5:
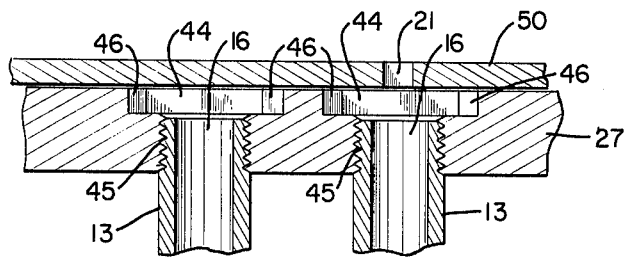
FIGURE 5 is a detailed sectional view of the relative disposition and arrangement between the rotary seal control aperture and the outlet lines.

One or more inlet lines may lead into the manifold; however, in the preferred form a single inlet line is shown as being connected through an opening in side wall 28 of the housing, there being a threaded adaptor 30 in the opening and forming the inlet port 15 for permanent connection of the inlet line thereto. The adaptor includes an enlarged head portion 31 positioned in flush abutting relation against the inner surface of the side wall 28 together with a stationary valve disk 32 traversing the inner end of the head 31, the disk being provided with a limited valve opening 33. Preferably, the opening 33 is of curvilinear trapezoidal configuration and is disposed in offset relation beneath the center of the disk. To control opening and closing of the valve, a valve control member is defined by a segmental plate 34 positioned against the outer surface of the disk 32. The plate 34 is of somewhat elongated form having an upper pivotal end portion 35 secured to the outer face of the disk by means of a threaded pivot pin 36 projecting inwardly through the plate and disk 32; and the lower free end 38 of the plate is of a shape corresponding to that of the opening 33 but of somewhat greater size so as to lie in normally overlapping relation to the opening, as shown in FIGURE 3. To open the valve, the plate is movable under rotation of the pivot pin 36 to pivot the lower end 38 away from the opening 33 to the position shown in FIGURE 4 thereby to permit the flow of water through the valve opening into the manifold. To control the movement of the plate, the inner projecting end of the pivot pin 36 has a cam control member 40 fixed thereto, the cam 40 being of irregular shape; and in the form shown the cam is five-sided with an upper cam surface 41 and a lower cam surface 42. The surfaces 41 and 42 are so related that when the lower surface 42 is rotated about the pivot pin from the inclined position shown in FIGURE 3 to the horizontal position shown in FIGURE 4, the valve member will be rotated about the pivot pin from the closed position to the open position; however, in the open position the upper cam surface 41 is inclined upwardly and, upon rotation of the surface about the pivot pin to the horizontal position shown in FIGURE 3, the valve plate will return to the closed position. Accordingly, depending upon which surface is engaged, the valve may be urged into either the open or closed position and in movement will rotate in a direction transverse to the direction of inlet flow so as to require relatively low torque or force in opening and closing. Moreover, the entire valve assembly is self-sealing in that the valve plate is positioned against the outer face of the disk so as to be forced under inlet pressure against the disk; whereas, the valve controlling elements are all positioned on the opposite inside of the disk away from the inlet port so as not to interfere with the flow of water into the manifold.

The outlet lines 13 are connected into the manifold through the outlet ports 16 formed in the bottom wall 27 in a common circle about the center of the housing. Each port includes an upper shallow recessed portion 44 communicating with a lower opening 45 extending vertically through the lower thickness of the bottom wall, and each opening having a threaded surface for connection of the inner threaded end of each of the outlet lines 13. The upper recessed portion 45 for each port is of curvilinear generally trapezoidal configuration being bounded by spaced, radially extending sides 46 with inner and outer curved ends 47 and 48, respectively. As illustrated, the ports are disposed at equally spaced, circumferential intervals about the center of the housing, although such spacing may be suitably varied according to the desired positioning and spacing between the outlet lines.

In order to control the sequential flow of water through each of the outlet ports 16, the rotary seal assembly 20 is illustrated in the form of a relatively flat circular disk 50 at the lower end of a conical, downwardly divergent center support 51, for disposition in fluid-tight concentric relation over the ports. Preferably the undersurface of the disk is relieved or provided with a slight clearance inwardly of the outer surface portion overlying the outlet ports to insure that the outer surface portion is held in flush, fluid-tight relation against the bottom wall surface surrounding the outlet ports. In addition, the disk 50 includes a lower recessed area 52 in communication with a central bore 53 extending upwardly through the conical support member 51 and terminating in an enlarged rectangular opening 54, the latter being formed for loose-fitting insertion of the lower end of a square shaft 55. The undersurface of the shaft is of irregular shape to permit limited passage of water from the interior of the housing through the bore 53 and recess 52 to counteract the downward force of the water against the disk and which might otherwise tend to unduly restrict rotatable movement of the disk relative to the bottom wall 27. Also, the disk is composed of a material of limited flexibility and low friction so as to offer minimum resistance to rotation along the bottom wall surface.

The control aperture 21 is in the form of an elongated radial slot having its midpoint at the center line of the outlet ports 16. In this way, the slot is aligned for advancement in succession over each of the ports for delivery of the water from the casing through each outlet line 13. Each of the ports is provided with an enlarged recess portion 44 with a limited space between ports to minimize the transition period of movement of the slot 21 therebetween and to establish maximum flow during the complete cycle for each outlet line. Preferably, the spacing between the ports is such that the control aperture will begin to pass over the next port in succession as it leaves the preceding port, thus minimizing the transition time as well as avoiding sudden pressure changes in the system, and such spacing may be varied in accordance with the size of the control aperture 21 and outlet ports 16.

To rotate the control aperture over each of the outlet ports in succession, the drive means includes square shaft 55 having an upper fitting 56 with a transverse opening 57 therein for connection of the inlet control arm 24; and the shaft 55 forms a lower extension of a cylindrical drive shaft 58 projecting downwardly in journaled relation through the top wall 26 of the housing. The gear drive 22 controls rotation of the drive shaft 58 by means of pinion gear 60 keyed for rotation to the upper splined end 59 of the drive shaft; in turn the gear 60 is driven by a worm gear 61 extending from the drive motor 23. Under rotation the corners of the square shaft will engage the sides of the opening 54 to rotate the support 51 and connected disk 50. The shaft 55 is firmly held within the opening 54 by a spring assembly 64 positioned in surrounding relation to the drive shaft 58 between the top wall 26 and fitting 56 and which is biased to exert a downward pressure against the shaft 55. As illustrated, the spring assembly is comprised of spaced upper and lower washers 65 and 66 between which are positioned a bellows 67 and an outer compression spring 68 with the force of the spring acting against the lower washer 66 to exert the desired downward pressure; also, the assembly 64 forms a tight seal between the upper end of the drive shaft 58 and the top wall of the casing.

As shown in FIGURE 1, the drive motor 23 consists of an electric motor unit mounted on a platform 69 above the casing. The motor is provided with a limit switch 70 supported on arm 72 extending forwardly from the motor through lines 74 and 75, a master switch 76 being connected in one line 74 and the limit switch 70 being connected in the line 75. The pinion gear 60 has a tripper arm 78 projecting from its undersurface for engagement with the limit switch whereby to open the switch 70 and interrupt the circuit between the outlet 73 and the drive motor. Accordingly, when the master switch is energized, the drive motor through rotation of the worm gear will advance the rotary seal assembly through a complete cycle at which point the tripper arm will engage the limit switch to stop the drive motor. In the absence of an inlet control valve and assuming that the outlet is open, the tripper arm is angularly disposed relative to the control aperture to stop the drive motor when the control aperture is in a closed position, or "dead" space, between ports. Between cycles, therefore, the outlet side of the casing is closed to permit water to accumulate and remain in the casing until the motor is energized for another cycle of operation. Through the 360° cycle, of course, the control aperture will successively advance into registry with each of the outlet ports and permit the outward flow of water from the casing through each of the outlet lines in succession.

Most desirably, the inlet is controlled by the inlet valve assembly to open at the beginning of each cycle and to close at the end of the cycle. In this way, water will not accumulate in the casing and exert undue pressure against the rotary seal assembly when not in use. To automatically control opening and closing of the inlet valve assembly, the member 24 is in the form of an elongated shaft or follower arm of limited flexibility having an inner threaded end 80 connected to the fitting 56. The shaft extends horizontally from the fitting with its outer free end 82 horizontally aligned in relation to the cam 40. The outer end 82 is generally T-shaped to provide a transverse supporting plate 83 carrying a pair of upper and lower, threadedly adjustable cam-engaging pins 87 and 88, respectively. From FIGURES 1, 3, and 4, it will be noted that the support 86 is disposed at an angle such that under clockwise rotation the upper pin 87 defines the leading cam-engaging member and the lower pin 88 defines the trailing cam-engaging member; and lock nuts 89 and 90 are secured on the respective pins to adjustably position the pins for outward extension slightly past the cam 40. At the beginning of each cycle, the arm is in the position shown in FIGURE 3 with the upper cam surface 41 in horizontal disposition and the lower surface 42 inclined in the path of travel of the trailing pin 88. Under rotation of the drive shaft in a clockwise direction, the follower arm 24 will follow the rotation of the drive shaft with the trailing pin 88 moving horizontally to the right and forcing the cam to pivot in a counterclockwise direction toward the horizontal position shown in FIGURE 4. Simultaneously, the valve plate 34 will rotate with the cam 40 away from the closed position into the open position shown in FIGURE 4 at which point the lower pin will have cleared the lower surface 42. Under continued rotation the arm will sweep completely around the casing as the slot 21 advances in succession over each of the outlet ports. Toward the end of the cycle, the upper cam-engaging pin 87 will, upon reaching the position shown in FIGURE 4, engage the upper surface 41 and act against it to cause it to rotate in a clockwise direction thus causing return of the valve plate to the closed position shown in FIGURE 3. The tripper arm 76 on the pinion 60 is positioned relative to the follower arm to move into engagement with the limit switch 74 and stop the motor when the arm has reached the position shown in FIGURE 3. By controlling the angular relationship between the follower arm and tripper arm in the manner described, the casing will be free of water when the sprinkling system is turned off thus minimizing any freezing or corrosion of parts when not in use. The follower arm 24 is of limited flexibility so as to permit slight movement of the pins 87 and 88 away from the horizontal in acting against the cam surfaces 41 and 42. Also, the cam surfaces may be notched at their corners, as shown, to engage the respective pins and insure that the pins will not slip away from the cam surfaces before advancing each of the surfaces into the horizontal position as described.

From the foregoing detailed description, it will be apparent that the valve structure of the present invention is comparatively simple and easy to operate while being very efficient and dependable. Individual valve controls for each outlet line are eliminated and, of particular importance, all moving parts are assembled and contained within the casing, with the exception of the motor and gear drives, so as to be tamper-proof, compact and more reliable in operation. The distribution valve may be used effectively with or without the inlet valve flow control assembly, although the valve structure is considered to be of particular utility by virtue of the cooperative disposition and arrangement between the inlet and outlet flow control units. In addition, the rotary seal and drive shaft are so related as to be directly responsive to automatic control through the timer or drive control unit. However, it is to be understood that the drive systems as described are given as being merely illustrative; and, various other modifications and changes may be made in the construction and arrangement of parts comprising the present invention, as well as its intended application, without departing from the spirit and scope thereof as defined by the appended claims.

What is claimed is:

1. A fluid distribution valve for controlling fluid flow from a main source of fluid through a plurality of branch lines, said valve comprising in combination a casing having at least one inlet port, a stationary valve disk with a valve opening disposed across the inlet port, a pivotal valve member being movable between a closed position over the valve opening and an open position to one side of the opening, a plurality of outlet ports each in fluid flow communication with a branch line, a rotary seal in said casing being normally disposed in fluid-tight relation over said ports with a control aperture therein being of a width less than the width of the outlet ports for continuous rotation across being aligned for each of said ports in succession, drive means for continuously rotating said rotary seal to advance the control aperture across said outlet ports through a complete revolution, and inlet control means engageable with said pivotal valve member in response to actuation of said drive means to move said pivotal valve member from the closed to the open position for the admission of fluid into said casing as the control aperture is advanced across each of said outlet ports in succession through each complete revolution.

2. A fluid distribution valve for regulating the flow distribution of water from a main water source through a plurality of branch lines in a sprinkler system, said valve comprising in combination a closed cylindrical casing having a flat bottom wall portion and a side wall, an inlet port in said side wall, a stationary valve disk with a limited valve opening disposed across the inlet port, a valve member including a pivotal plate disposed against the outer surface of said valve disk in overlapping relation to said valve opening, a pivot pin projecting inwardly from one end of said valve plate through said valve disk and having a cam member at the inner end thereof being movable to urge said pivotal plate between a closed position over the valve opening to an open position to one side of the opening, a plurality of outlet ports in said bottom wall portion each port being in fluid flow communication with a branch line, a rotary seal including a rotatable disk disposed in fluid-tight relation over said outlet ports with at least one control aperture in said disk being aligned for advancement into registry with each of said ports in succession, drive means including a drive shaft for selectively advancing said seal and control aperture relative to said outlet ports, and an inlet control arm on said drive shaft being engageable with said cam in response to actuation of said drive means to urge said pivotal plate between the open and closed positions for the controlled admission of fluid into said casing.

3. A fluid distribution valve according to claim 2, said inlet control arm being engageable with one side of said cam at the beginning of each rotational cycle of said rotary seal to move said valve plate to an open position, and said arm being further engageable with another side of said cam to return said valve plate to the closed position at the end of each rotational cycle.

4. A fluid distribution valve according to claim 3, said drive shaft extending upwardly from said rotary seal, and said drive means including a gear drive rotatably engaging the upper end of said drive shaft, a tripper arm rotatable with said drive shaft and gear drive, and a drive motor including a limit switch positioned in the path of travel of said tripper arm, said tripper arm being angularly positioned in relation to said inlet control arm to engage said limit switch and de-energize said drive motor at the end of each cycle of rotation of said drive shaft and rotary seal.

5. A fluid distribution valve according to claim 2, said cam member having upper and lower cam surfaces, and said inlet control arm extending outwardly from said shaft in a horizontal direction, said arm having spaced upper and lower cam-engaging members for engaging said upper and lower cam surfaces, respectively, to pivot said cam and said valve plate in opposite directions about said pivot pin.

6. A distribution valve comprising: a casing having flat top and bottom wall portions and a cylindrical side wall therebetween, a lateral inlet port in the side wall including a stationary valve disk with a limited valve opening disposed across the inlet port, a pivotal valve member in the form of a plate disposed in flush abutting relation against the outer surface of said disk, said plate having a pivotal end portion and a free end portion, a pivot pin projecting inwardly from the pivotal end portion through said disk and a cam member at the inner end of said pin being rotatable about said pin to move said valve member from a closed position to an open position to one side of the opening; a plurality of outlet ports in said bottom wall portion, each port having an upper recessed portion converging into a lower opening, a rotary seal including a flat circular disk disposed in fluid-tight relation over said outlet ports, an elongated radial slot in said circular disk being aligned for advancement into registry with each of said outlet ports in succession and a disk-supporting portion extending upwardly from said circular disk with an upper shaft-receiving opening of limited depth therein; means for selectively advancing said disk and slot relative to said outlet ports including a drive shaft extending upwardly through said top wall portion from said disk-supporting portion, a gear drive and motor for rotating said drive shaft and rotary seal whereby to advance said slot across each of said outlet ports in succession; an inlet control arm extending horizontally from said drive shaft for rotation about the axis of said drive shaft, said arm having first means engageable with said cam at the beginning of each rotational cycle to move said valve member to the open position and second means engageable with said cam at the end of each rotational cycle to return said valve member to the closed position; and limit switch means between said gear drive and motor to de-energize said motor at the end of each rotational cycle.

7. In a fluid distribution valve for controlling the flow of fluid under pressure from a main fluid supply source through a plurality of outlet lines, a casing having side and end wall portions, an inlet port in communication with the main fluid supply source and a plurality of circumferentially spaced outlet ports in one end wall portion of the casing each in communication with an outlet line, each of said outlet ports having recessed portions along the inner surface of said end wall portion being relatively wide in relation to the circumferential spacing between outlet ports, a rotary valve disk member in said casing being disposed in sealed relation against the one end wall portion over the recessed portions for said outlet ports with a control aperture in said disk member being aligned for successive advancement across each of said outlet ports for fluid flow therethrough said control aperture being of a width less than the width of said recessed portions, and drive means engageable with said disk member for advancing said disk member and control aperture relative to said outlet ports independently of fluid flow into said casing through said inlet port.

8. A fluid distribution valve according to claim 7 wherein said control aperture and the recessed portions for said outlet ports have radial sides with the sides of the control aperture being aligned in substantially parallel relation to the sides of each of the respective recessed portions for the outlet ports as said control aperture is advanced across each of the respective outlet ports, and said control aperture being further movable into sealed relation with the one end wall portion between a pair of adjacent outlet ports to interrupt fluid flow from the casing through the outlet lines.

9. A fluid distribution valve according to claim 7, the recessed portion for each of said outlet ports being of generally trapezoidal configuration and said control aperture being in the form of a radial slot of a width corresponding to the circumferential spacing between said outlet ports.

10. In a liquid distribution valve for controlling the flow from a main supply source through a plurality of outlet lines, said valve comprising in combination a casing having a flat bottom wall portion, an inlet in said casing above the bottom wall portion in communication with the main supply source, a plurality of outlet ports in circumferentially spaced relation along said bottom wall portion each outlet port being in liquid flow communication with an outlet line, a rotary seal in said casing having a disk being centered for rotation in fluid-tight relation over said outlet ports, with a control aperture in said disk being aligned for successive advancement into registry with each of said outlet ports, rotary drive means including a drive shaft engageable with said rotary seal for continuously advancing the control aperture across each of said outlet ports in succession, and each of said outlet ports including an upper enlarged recessed portion of generally trapezoidal configuration in said bottom wall portion in facing relation to said disk and control aperture therein, and said control aperture being in the form of an elongated radial slot of narrow width in relation to the width of each of said recessed portions to establish substantially uniform flow through said outlet line in advancing across each recessed portion in succession.

11. In a liquid distribution valve according to claim 10, each of the recessed portions being enlarged in relation to the circumferential spacing therebetween, and the control aperture being of a width corresponding to the circumferential spacing between recessed portions.

12. In a liquid distribution valve according to claim 10, said drive means being characterized by constant speed drive means for continuous rotation of said control aperture across the outlet ports, and further including limit means correlated with the movement of said drive means to deenergize the drive means when the control aperture is aligned in sealed relation against said bottom wall portion between adjacent outlet ports.

References Cited by the Examiner
UNITED STATES PATENTS

| | | | |
|---|---|---|---|
| 1,107,342 | 8/1914 | Patterson | 251—177 |
| 1,554,759 | 9/1925 | Powell | 251—177 X |
| 2,306,748 | 12/1942 | Peterson | 222—330 X |
| 2,601,534 | 7/1952 | Laffoon | 222—330 |
| 2,610,646 | 9/1952 | Michaelson et al. | 222—330 X |
| 2,644,484 | 7/1953 | Mansen | 137—608 X |
| 2,988,108 | 6/1961 | Malmquist et al. | 137—625.46 |
| 3,014,489 | 12/1961 | Lamp et al. | 137—614.11 X |
| 3,066,909 | 12/1962 | Reed | 251—283 X |
| 3,096,787 | 7/1963 | Kayler | 137—624.18 X |

M. CARY NELSON, *Primary Examiner.*

LAVERNE D. GEIGER, *Examiner.*